April 24, 1962     G. D. GOLTERMANN     3,030,842
AUTOMATIC FOOD SLICER
Filed May 19, 1958
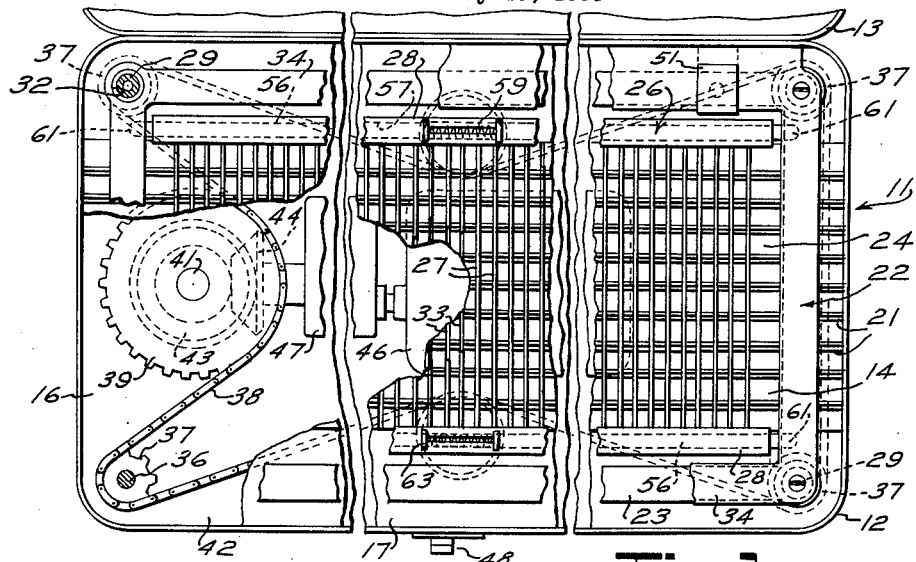
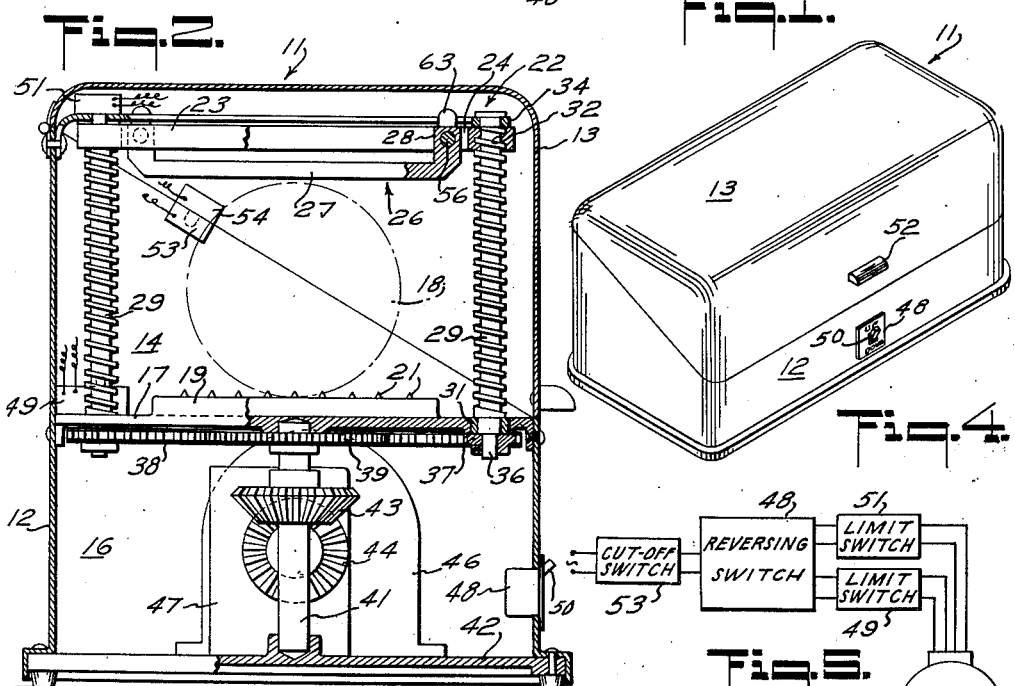
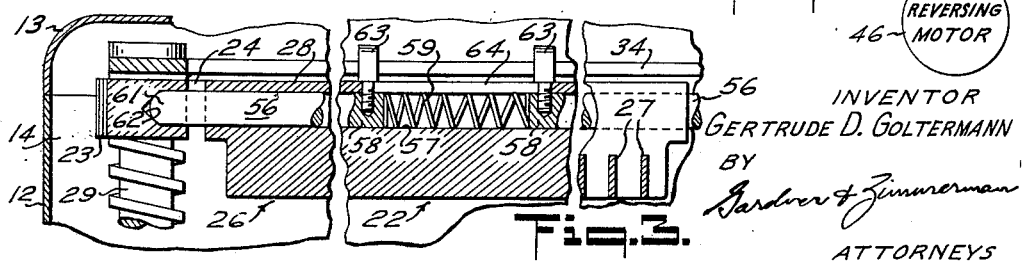
INVENTOR
GERTRUDE D. GOLTERMANN
BY
*Gardner & Zimmerman*
ATTORNEYS

United States Patent Office 3,030,842
Patented Apr. 24, 1962

3,030,842
AUTOMATIC FOOD SLICER
Gertrude D. Goltermann, 252 13th St., Richmond, Calif.
Filed May 19, 1958, Ser. No. 736,032
1 Claim. (Cl. 83—564)

This invention relates to food slicing devices and is more particularly directed towards an automatic slicer for cutting pre-formed food mixtures such as rolls of chilled cookie dough or the like into a plurality of slices of substantially uniform thickness.

It is an object of this invention to provide a cutting mechanism for cutting a plurality of slices from a generally elongated mass, such as chilled cookie dough, in which a plurality of reciprocating knives are caused to simultaneously and automatically pass through the mass to produce such slices whereupon the slicing mechanism is disposed subjacent the mass in order to facilitate easy removal of the slices.

It is another object of the present invention to provide a device of the character described in which safety means are incorporated to prevent actuation of the slicing mechanism when a food roll is being inserted for slicing or when the slices are being removed therefrom.

It is a further object of the present invention to provide an automatic food slicer having a slicing chamber that may be exposed when the device is not in operation to provide for the easy introduction of a food roll thereinto as well as to facilitate subsequent removal of the slices and cleaning of such chamber, and in which the slicing unit may be completely removed from the device for purposes of cleaning or the like.

A still further object of the present invention is to provide a device of the character described which is especially adapted for use in the home kitchen, being of a convenient size for such purpose as well as being completely contained in an attractive housing so that it may be displayed in the same manner as are other portable electrical kitchen appliances.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a top plan view of the food slicer of the present invention, the cover thereof being shown in an open position, and portions of the device being broken away to more clearly illustrate the structure.

FIGURE 2 is an end elevational view with the housing removed and portions of the device being broken away in order to show structural details.

FIGURE 3 is a portional longitudinal vertical sectional view of the slicing device on an enlarged scale.

FIGURE 4 is a perspective view on a smaller scale of the device in a closed position.

FIGURE 5 is a diagrammatic representation of the electrical control circuit.

Considering now the invention in some detail and referring to the figures of the drawing, there is shown a food slicer 11 encased in a generally rectangular housing 12 having four walls and an open top which is provided with a cover 13 hinged to a rear wall of the housing 12. As best seen in FIGURE 2 of the drawing, the housing is divided into an upper and lower compartment 14 and 16 respectively, by means of a horizontally extending plate 17, suitably secured to the housing walls as by rivets or the like.

The upper compartment 14 is arranged to receive a food roll 18, and in this connection the plate 17 is provided with a longitudinally extending raised platform 19 which is centrally aligned transversely of the plate. Such platform is designed to support and maintain the roll 18 in position during the slicing operation by means of longitudinally extending ridges 21 which engage the lower surface of the roll. Spaced a substantial distance above the plate 17 so as to overlie the food roll, a slicing unit 22 is operatively mounted for vertical reciprocal movement whereby the slicing operation may be effected.

As here shown the slicing unit 22 comprises a rectangular support frame 23 defining a cental opening 24 in which is disposed a cutting member 26 which constitutes a plurality of equally spaced knife blades 27 extending transversely between a pair of longitudinally extending bars 28, such blades and bars preferably constituting a unitary structure by welding or the like. Each of such blades is preferably formed of a flat plate of stainless steel or the like, the blades being sufficiently thin to permit their ready passage through the dough upon descension thereof.

The cutting member 26 is releasably mounted on the frame 23, in a manner later to be described, so that the blades extend in transverse relation to the platform 19 whereby the food roll positioned thereon will be cut transversely of its axis into slices of predetermined thickness.

Considering now the slicing operation there are provided a plurality of threaded vertical posts 29 rotatably journaled in bearings 31 mounted in the plate 17. In the present embodiment four such posts are shown positioned in the corners of the plate 17 and arranged to be engaged by threaded holes 32 provided in corners of the frame 23 remote from the blades 27. It will thus be seen that upon rotation of the posts 29 in one direction the slicing unit 22 will move downwardly so that the blades 27 pass through the food roll to effect the slicing thereof. It will be noted here that the platform 19 is provided with transverse slots 33 in registration with the blades 27 so that when the slicing unit reaches the end of its downward travel, the knife blades enter into the slots in order to assure complete severance of the roll by the knives.

In order to prevent possible vertical displacement of the posts 29, the upper ends thereof are freely mounted in a bracing member 34 which overlies the slicing unit 22 and is fixed to the rear wall of the housing 12 adjacent the upper open side thereof.

Rotation is imparted to the posts 29 in a manner now to be described. As best shown in FIGURE 2 of the drawing, the lower ends of the posts extend through the bearings 31 into the lower compartment 16 of the device. Such ends terminate in reduced portions 36 and have secured thereto subjacent the plate 17 sprocket wheels 37 which are engaged by a link chain 38. A main sprocket wheel 39 likewise engaging the chain 38 is secured to a vertically extending shaft 41, the upper end of which is journaled in the plate 17 while the other end is mounted in a base plate 42 which is secured as by screws or the like to the walls of the housing 12 at the bottom thereof. Mounted on the shaft 41 subjacent the main sprocket wheel 39 is a bevel gear 43 in mesh with a bevel drive gear 44 which is rotated by suitable drive means such as a reversing motor 46 of known construction through a gear reduction box 47 likewise of conventional construction.

The above described slicing operation is initiated by means of a conventional reversing switch 48 mounted exteriorly of the housing 12. The switch is provided with a manual toggle 50 moveable between an "up" and "down" position. With the slicing unit 22 in its raised position as here shown, the toggle 50 is likewise disposed in its "up" position. Movement of the toggle to the "down" position actuates the motor, through a normally closed limit switch 49 of known construction, to turn in the proper direction to cause the descension of the knives of the unit through the food roll. When the unit reaches the end of its downward travel the frame 23 thereof strikes the limit switch 49 to open it thereby de-energizing the motor.

At this time, it should be noted, the blades 27 are positioned below the platform and therefore out of contact with the sliced food roll. Upon opening the cover 13 as by a handle 52 the compartment 14 is thus readily accessible for removal of the slices therefrom.

In order to reposition the slicing unit for the next slicing operation it is only necessary to close the cover 13 and move the toggle 50 to the up position. The reversing switch 48 thereupon actuates the motor, through a normally closed limit switch 51 of conventional construction, causing the motor to reverse its rotational direction in order to raise the slicing unit. As the unit reaches its original upper position the frame 23 strikes the limit switch 51 thereby opening the circuit so that the motor is once again de-energized.

As a further important feature of the present invention there is provided safety means to prevent inadvertent actuation of the mechanism while the cover is in an open position. Such means will be seen to comprise a cut-off switch 53 of conventional construction secured to the housing and maintained in a circuit closing position when the cover is down by means of a detent 54 mounted on the cover in engaging relation with the switch 53. Opening of the cover allows the cut-off switch to open thereby breaking the circuit so that actuation of the switch 48 at such time will not be effective to complete the circuit.

As previously explained, when the food roll is placed in the compartment 14, the slicing unit is necessarily disposed in its uppermost position. While the roll may be placed in the compartment through the front portion thereof, under the slicing unit, as an additional convenience as well as for cleaning purposes the cutting member 26 may be completely removed from the frame opening 24 of the slicing unit, or alternatively the member 26 may be swung upwardly out of the opening. Thus the cutting member is releasably mounted on the frame 23, such mounting means as here illustrated comprising a pair of spring loaded pins 56 positioned in a longitudinally extending bore 57 provided in each of the bars 28 of the cutting member. Positioned medially in each bore and interposed between confronting ends 58 of each pair of pins is a compression spring 59 which maintains the pins in a normally extended position so that the opposite ends 61 of the pins extend exteriorly of the bars to engage apertures 62 suitably provided in the support frame 23.

To facilitate removal of the cutting member from the supporting frame, vertically disposed tabs 63 are threaded or otherwise secured adjacent the confronting ends 58 of the pins. Such tabs project exteriorly of the bars 28 by means of a longitudinally extending slot 64 provided medially of each bar and which is in communication with the bore 57 to permit movement of the tabs into substantially abutting relationship so that the ends 61 of the pins are withdrawn from engagement with the frame apertures 62.

From the foregoing it will be apparent that the cutting member may be completely removed from the frame by simply pressing together the two tabs of each pair of pins thereby exposing the opening 24 defined by the support frame. Similarly by pressing together the tabs of the pins in one bar the cutting member may be swung upwardly about the other pair of pins which in this instance functions as a pivot.

Attention is also directed to the fact that the front wall of the housing 12 terminates adjacent the plate 17, whereas the rear wall thereof extends to substantially the tops of posts 29, the side walls being sloped accordingly. The cover member 13 is formed generally complementary to that of the housing so that maximum access can be had to the housing by raising of the cover and without requiring a waste space between the operating portions of the unit and the housing and cover members. This permits a compact, attractive casing which will readily fit in with other modern kitchen equipment.

What is claimed is:

A cutting mechanism including a housing having a bottom and an open top and a horizontally disposed base disposed in spaced relation to the bottom thereof, a plurality of threaded shafts journalled for rotation adjacent opposed corners of said base and extending upwardly therefrom, a frame extending peripherally of the base and having corner portions thereof threadedly engageable with said shafts and movable upon rotation of said shafts in one direction upwardly from said base and upon rotation of said shafts in the opposite direction downwardly toward said base, a pair of parallel members, a plurality of cutting blades extending transversely between and connected to said members, spring loaded elements at the ends of each said members journalled in said frame at opposed end portions thereof and selectively retractable from said frame into the member whereby upon retraction of the elements carried by one of said members, said member and the blades carried thereby may be pivoted relative to said frame on the elements carried by the other member or upon retraction of the elements carried by both said members, the members and the blades carried thereby may be removed from the frame, a reversing motor positioned within said housing below said base and connected in driving relation to each of said shafts for rotating the latter, a reversing switch having a toggle selectably moveable between up and down positions, and first and second normally closed limit switches respectively connecting said reversing switch in actuating relation to said motor in response to movement of said toggle to the up and down positions with the motor thereby rotating said shafts in said one direction to move the frame upward when the toggle is in the up position and in said opposite direction to move said frame downward when the toggle is in the down position, said first and second limit switches being engageable by said frame upon movement of the latter to its upper and lower limits of travel respectively and being opened by such engagement to de-energize said motor.

References Cited in the file of this patent

UNITED STATES PATENTS

| | | |
|---|---|---|
| 113,246 | Beasley | Apr. 4, 1871 |
| 508,984 | Rudloff | Nov. 21, 1893 |
| 722,452 | Mossner | Mar. 10, 1903 |
| 1,419,037 | Freer | June 6, 1922 |
| 1,447,900 | Schott | Mar. 6, 1923 |
| 1,943,113 | Daum | Jan. 9, 1934 |
| 1,959,962 | Nelson | May 22, 1934 |
| 2,087,728 | Boriski | July 20, 1937 |
| 2,103,317 | Cavagnaro | Dec. 28, 1937 |
| 2,181,079 | Dehuff | Nov. 21, 1939 |
| 2,653,660 | Koch | Sept. 29, 1953 |
| 2,754,772 | Anetsberger | July 17, 1956 |